Figure 1:
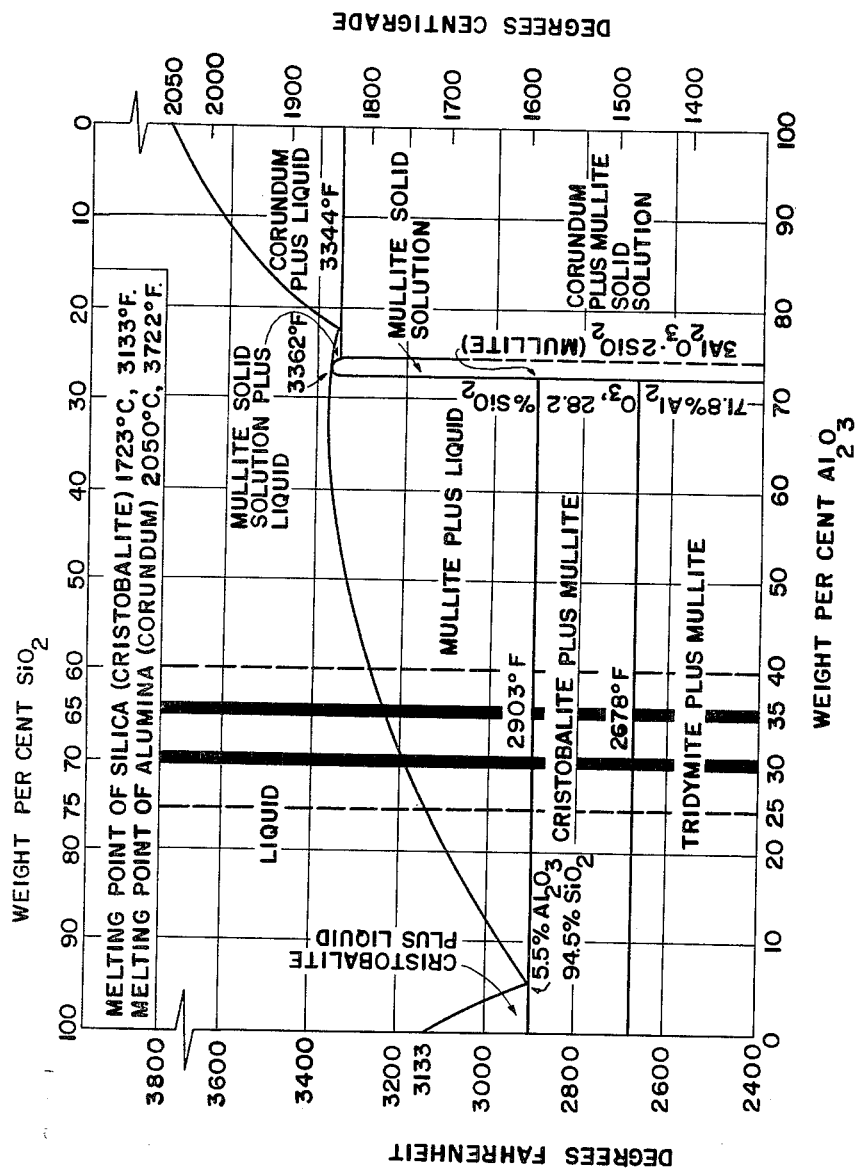

Dec. 14, 1965  R. W. LIMES ETAL  3,223,540
REFRACTORY COMPOSITION

Filed Oct. 11, 1962  2 Sheets-Sheet 2

INVENTOR.
ROBERT W. LIMES
BY MICHAEL P. FEDOCK

ATTORNEY

United States Patent Office 3,223,540
Patented Dec. 14, 1965

3,223,540
REFRACTORY COMPOSITION
Robert W. Limes, Cleveland, and Michael P. Fedock, Seven Hills, Ohio, assignors to Republic Steel Corporation, Cleveland, Ohio, a corporation of New Jersey
Filed Oct. 11, 1962, Ser. No. 229,873
13 Claims. (Cl. 106—65)

This invention relates to fireclay refractories having good spalling resistance and good load resistance. More particularly, this invention relates to a mullite-bonded silica refractory having improved load resistance and improved spalling resistance with a reduced amount of alumina in comparison with the amounts ordinarily required to give such improved properties.

Fireclay refractories have been the main product of the refractory industry for many years. The substantial deposits of refractory clays in many sections of the United States and the ease with which this material can be fabricated into usable refractory shapes has led to a low cost product which has found wide acceptance and use in industry.

Clays are essentially mixtures of alumina and silica, the clay mineral itself being approximately 46% alumina and 54% silica. However, free silica is found in many clays, some sandy varieties having a very high silica content. Refractories made from such high-silica clays are well known. These are known in the trade as semi-silica refractories.

Refractories are made also from raw silica rock. These high-silica refractories have extremely high resistance to deformation under load at relatively high temperatures, but they are extremely prone to failure under thermal shock, apparently due to mineral inversions upon heating.

If alumina is added to silica, a eutectic liquid containing approximately 5% alumina develops at 2900° F. The amount of liquid formed is dependent upon the alumina-silica ratio in the mixture. Therefore, there is a limit to which silica can be present in clays without destroying its refractoriness if equilibrium conditions are to be reached. The eutectic liquid is very viscous, a characteristic of all high silicious melts, and the viscosity decreases as the alumina goes into the liquid phase.

Semi-silica brick has been developed as a class of refractories intermediate between the fireclay types and high-silica types. Although the refractoriness of semi-silica brick is not as high as in fireclay brick, it shows better high temperature creep characteristics due to the type of liquids formed and their distribution within the refractory body. At the standard ASTM load test temperature of 2640° F., fireclay refractory will gradually slump and deform over a period of time while semi-silica will show less deformation and a slower rate of deformation. This ASTM load test is made according to Method C-16, Schedule 4, "Manual of ASTM on Refractories" (1957), pages 88–92.

At the other extreme, semi-silica refractory shows improved thermal shock resistance in comparison with high-silica brick which, because of its poor resistance to thermal shock, has a strong tendency to spall. Therefore, semi-silica refractories fill a need in furnace construction where resistance is required for both deformation under load and thermal shock which requirement would rule out the use of fireclay brick and silica brick respectively. For this reason, semi-silica brick has been used extensively in blast furnace stoves and in soaking pits.

These respective properties can be tabulated as follows:

|  | Fireclay | Semi-Silica | Mullite-bonded Silica Brick | High-Silica |
|---|---|---|---|---|
| Resistance to Deformation Under Load. | Poor | Intermediate | Improved Intermediate. | Good. |
| Refractoriness or Resistance to Spalling. | Good | ---do--- | ---do--- | Poor. |

It is believed that these differences in properties are due to the type of liquids formed during the firing of the brick and their distribution within the refractory body. Where a substantial amount of glass is formed within the refractory body, this results in poor properties with respect to thermal shock or spalling, and resistance to deformation under load.

In the accompanying drawings FIG. 1 shows a phase diagram of various compositions of alumina and silica.

Figure 2:
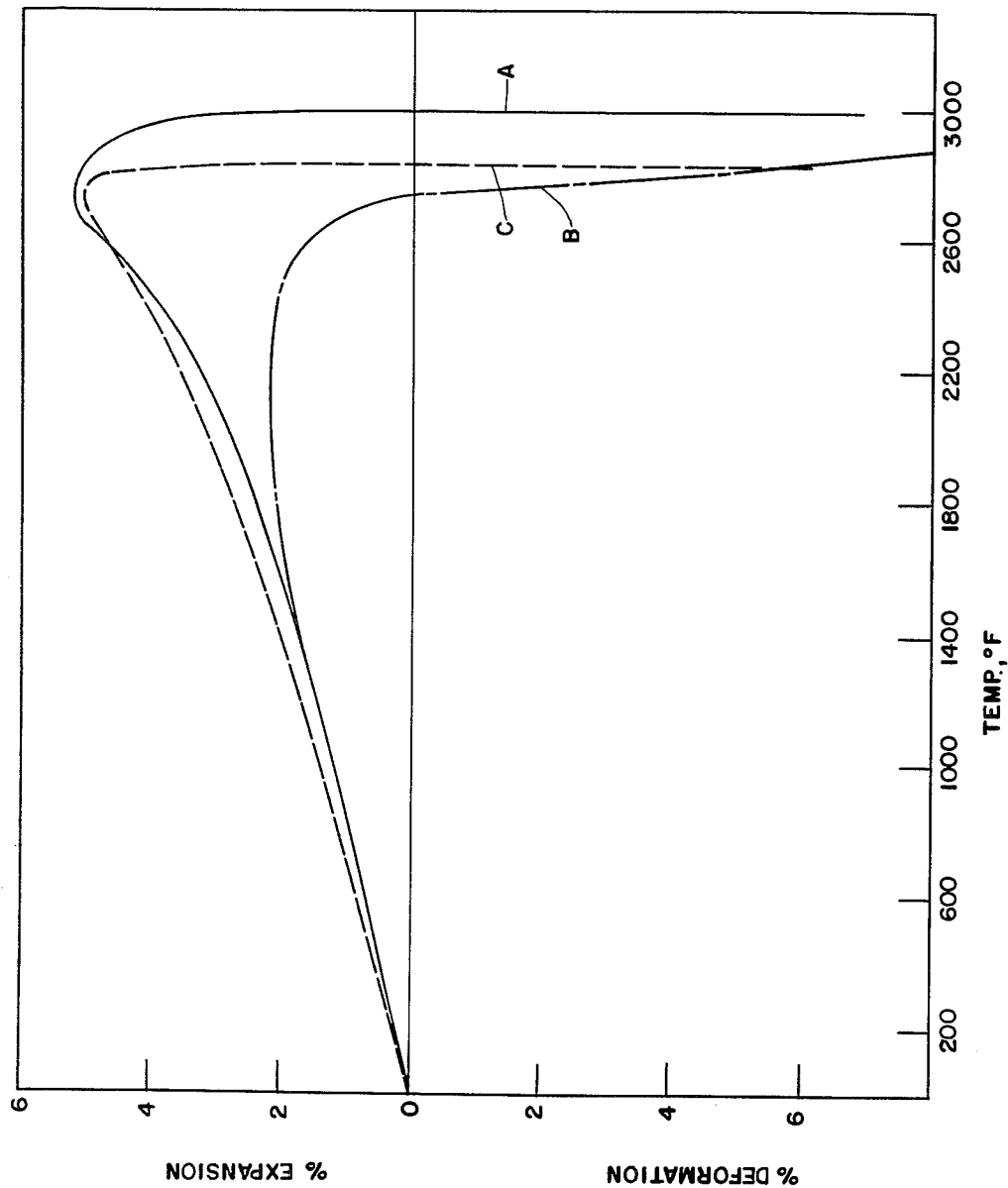

FIG. 2 shows curves plotted for expansion and deformation (load to failure) tests for a refractory composition (A) of this invention compared with a fireclay refractory (B) and with a commercial semi-silica product (C).

It is believed that the properties described above with respect to varying proportions of the two components can be attributed to the types of materials formed by their reaction and the manner in which they are distributed through the refractory body. If equilibrium conditions are allowed to be reached, then the resultant character of the refractory will be determined by the composition as can be predicted somewhat by the phase diagram. Glass formation is desirably maintained at a minimum whereas mullite formation is desirable to give properties of mullite brick.

In accordance with the present invention, it has now been found that the advantages of both high silica brick, with respect to resistance to deformation under load at high temperatures, and of fireclay brick, with respect to good refractory properties and resistance to spalling, can be effected by a proper selection of the particle size and amounts of the various components of the refractory mixture even without the addition of large amounts of the more expensive alumina. Moreover, the improvements in these respective properties are found to be improvements also over the corresponding properties of semi-silica brick. From such selected particle sized mixtures, refractories of good spalling resistance, good load resistance, and satisfactory packing density can be prepared.

By proper selection of particle size of the silica and alumina, it is possible to prepare refractories of these good properties with 60–75%, preferably 65–70% silica, and 25–40%, preferably 30–35% alumina. By using coarse silica, that is having no silica of less than 20 mesh, and finely divided alumina in the range of 100–325 mesh or even finer, preferably 270–325 or even finer mesh alumina, it is possible to form a mullite coating on the surface of the silica particles, thereby retaining the high load strength of the silica. In view of the large or coarse particle size of the silica, there is less contact area between the silica and alumina and their reaction is therefore slower and limited. By having the mullite serve as a binder between silica particles and as a coating thereof, the thermal shock resistance is also retained. Moreover, inversions ordinarily taking place within the silica grains are cushioned by the mullite envelope which protects additional silica from reaction. Glass formation is kept to a minimum by not allowing equilibrium conditions to be reached.

It has been found that by such proper selection of particle size, porosity of only approximately 24–32% is attained, with optimum conditions giving approximately 24%. As a result, the refractory has fairly good density.

In selecting the coarse silica it is found advantageous to use particles which will pass through a 3 mesh screen but not through a 20 mesh screen and to have approximately half the material of a size that will not pass through a 10 mesh screen. In view of the coarse particle size of the silica it is possible to use salvage refractory as the source of the silica with resultant economic advantage.

Various types of commercially available finely divided alumina can be used in the practice of this invention, preferably calcined alumina and tabular alumina; various grades of finely divided bauxite are also available. These are predominantly alumina and those grades which have very low amounts of silica therein or have been beneficiated to reduce the amount of silica therein can be used. Since the silica in such cases is finely divided and therefore results in increased glass formation, it is desirable to have as little as possible.

Therefore those bauxites in which there is substantially no silica are preferred for use in this invention, advantageously less than 5%, preferably less than 2%.

This invention involves the use of a composition in which equilibrium conditions are not attained. In accordance with the phase diagram of FIG. 1, if mixtures of pure alumina and pure silica are made in the high silica range and conditions are maintained so that equilibrium is reached, a eutectic develops at 2900° F. with approximately 5 percent alumina. Above about 72 percent alumina, the eutectic disappears with the principal mineral phases being mullite and corundum.

In the composition of this invention, the finely divided alumina reacts only with the surface of the coarse silica grain, forming a mullite coating and minimizing the formation of eutectic liquid. The desirable properties developed in the refractory of this invention are good resistance to deformation under load at high temperatures and good resistance to thermal spalling.

The following tabulation compares these properties with a semi-silica commercial brick.

|  | 70 SiO$_2$ 30 Al$_2$O$_3$ | Commercial Semi-Silica Brick |
| --- | --- | --- |
| Load to Failure, °F | 3,000 | 2,825 |
| Panel Spalling 2,820° F | 0.0 | 26.4 |

FIG. 2 shows deformation curves for 25 p.s.i. load for a composition of this invention (A) as compared with a commercial semi-silica brick (C) and with a fireclay brick (B). In this comparative test, although the product of this invention is made in this case from salvage silica aggregate, the failure temperature for this product is 175° F. higher than that of the semi-silica brick. Moreover, the brick of this invention is substantially free of shrinkage cracks.

The techniques of mixing, shaping and firing the refractory compositions are similar to those used presently in the manufacture of semi-silica brick. An organic binder, such as starch, gum arabic, sulfite liquor, etc., is generally used in the mixture to facilitate handling the composition. Such binders burn out completely during the firing operation.

The refractory is fired at about 2400°–2600° F., preferably about 2550° F., although the firing temperature can be modified according to the particular composition and according to the period of heating used. With longer heating periods, lower temperatures can be used, and shorter heating periods can be used with higher temperatures. For example, where the temperature is 2500° F., a heating period of 8 hours is satisfactory, using about 2 days to reach this temperature. In comparison a temperature of 2550° F. can be used for five hours with a five hour heating period to reach temperature. Corresponding modifications are known in the art.

The invention is best illustrated by the following example which is intended merely for illustrative purposes and is not to be interpreted as limiting in any way the scope of the invention or the manner in which it can be practiced. In this example and throughout the specification, reference to parts and percentages are intended to be parts by weight and percentages by weight unless specifically indicated otherwise.

*Example I*

A mixture of 32.3 parts of silica grog (salvage refractory) having a particle size which will pass through a 3 mesh screen but will not pass through a 10 mesh screen; 37.7 parts of silica grog having a particle size which will pass through a 10 mesh screen but not through a 20 mesh screen; 30 parts of tabular alumina having a particle size which will pass through a 325 mesh screen and one part of starch binder are blended in conventional mixing equipment to give a well-blended composition. This composition is pressed on a standard toggle press into a number of bricks. These are oven dried at 250° F. to remove water and then placed in a standard firing oven, which is a tunnel kiln gradually increasing in temperature throughout its length, which in this case is adjusted to provide two days of gradually increasing heat before the brick reaches the firing temperature of 2500° F. at which temperature the brick is maintained for 8 hours.

After the brick has been cooled, a number of tests are made on the brick with the following results: the modulus of rupture is 370; the linear change on firing is +1.07; the porosity is 28.6%; the bulk density is 116.8; the panel spalling is 0; and the load to failure is as shown by curve A in FIG. 2.

Similar results are obtained when calcined alumina is substituted in place of the tabular alumina in the above composition.

Mullite brick is very often now used in stove domes and stove wells where very high temperatures have to be resisted, and particularly where there are likely to be changes in the temperatures in these areas. Semi-silica brick is not capable of standing these high temperatures. If high silica brick is used in such places, the temperatures have to be very carefully maintained at the high temperature, or at least the rate of temperature modification or change has to be very carefully controlled to avoid thermal shock. Very often in order to avoid these disadvantages of high silica brick, e.g., maintaining a high constant temperature or carefully controlling changes in temperature to avoid thermal shock, mullite brick is used in such areas. While mullite brick has good load test properties and good resistance to temperature shock, it is an expensive brick because of the very high alumina content therein.

It has now been found that the mullite bonded silica brick of this invention can be used in stove domes and stove wells in place of the expensive mullite brick and is found to be capable of withstanding the high temperatures encountered in such places. Moreover, it can be used in place of the high-silica brick also used in such areas, but without having to maintain the constant high temperature or to carefully control any changes in temperature.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims:

The invention claimed is:

1. A composition suitable for improved refractories consisting essentially of 60–75 percent by weight of coarse silica having a particle size that will pass through a 3-mesh screen but will not pass through a 20-mesh screen, and 25–40 percent by weight of finely divided alumina of a particle size that will pass through a 100-mesh screen.

2. A composition of claim 1 in which said silica is 65–70 percent by weight of said composition and said alumina is 30–35 percent by weight of said composition.

3. A composition of claim 2 in which said alumina has a particle size that will pass through a 270-mesh screen and approximately half of said silica is of a particle size that will pass through a 3-mesh screen but will not pass through a 10-mesh screen.

4. A composition of claim 1 in which said alumina has a particle size that will pass through a 270-mesh screen and approximately half of said silica is of a particle size that will pass through a 3-mesh screen but will not pass through a 10-mesh screen.

5. A process for the manufacture of an improved refractory comprising the steps of:
   (a) blending a mixture consisting essentially of 60–75 percent by weight of coarse silica having a particle size that will pass through a 3-mesh screen but will not pass through a 20-mesh screen, and 25–40 percent by weight of finely divided alumina of a particle size that will pass through a 100-mesh screen;
   (b) pressing the resultant composition into a desired shape; and
   (c) thereafter firing said shaped composition at a temperature of about 2400–2600° F.

6. A process of claim 5, in which said temperature is approximately 2550° F.

7. A process of claim 5, in which said silica is 65–70 percent by weight of said composition and said alumina is 30–35 percent by weight of said composition.

8. A process of claim 7, in which said temperature is approximately 2550° F.

9. A process of claim 7, in which said alumina has a particle size that will pass through a 270-mesh screen and approximately half of said silica is of a particle size that will pass through a 3-mesh screen but will not pass through a 10-mesh screen.

10. A process of claim 9, in which said temperature is approximately 2550° F.

11. A process of claim 5, in which said alumina has a particle size that will pass through a 270-mesh screen and approximately half of said silica is of a particle size that will pass through a 3-mesh screen but will not pass through a 10-mesh screen.

12. A process of claim 11, in which said temperature is approximately 2550° F.

13. An improved refractory prepared according to the process of claim 5.

References Cited by the Examiner

UNITED STATES PATENTS

| | | | |
|---|---|---|---|
| 2,047,457 | 7/1936 | Benner et al. | 106—65 |
| 2,748,007 | 5/1956 | Badger et al. | 106—65 |

TOBIAS E. LEVOW, *Primary Examiner.*